US011447107B2

(12) United States Patent
Tsai

(10) Patent No.: US 11,447,107 B2
(45) Date of Patent: Sep. 20, 2022

(54) BRAKE DEVICE

(71) Applicant: Mu Chang Tsai, Chiayi (TW)

(72) Inventor: Mu Chang Tsai, Chiayi (TW)

( * ) Notice: Subject to any disclaimer, the term of this patent is extended or adjusted under 35 U.S.C. 154(b) by 600 days.

(21) Appl. No.: 16/585,012

(22) Filed: Sep. 27, 2019

(65) Prior Publication Data

US 2020/0101949 A1 Apr. 2, 2020

(30) Foreign Application Priority Data

Sep. 28, 2018 (TW) .................................. 107213249

(51) Int. Cl.
| | |
|---|---|
| *B60T 7/08* | (2006.01) |
| *B60T 1/04* | (2006.01) |
| *A61H 3/04* | (2006.01) |
| *F16D 49/04* | (2006.01) |
| *F16D 65/02* | (2006.01) |

(52) U.S. Cl.
CPC .............. *B60T 7/085* (2013.01); *A61H 3/04* (2013.01); *B60T 1/04* (2013.01); *F16D 49/04* (2013.01); *A61H 2003/046* (2013.01); *F16D 2065/1388* (2013.01)

(58) Field of Classification Search
CPC ..... B60T 1/02; B60T 1/04; B60T 1/06; B60T 1/062; B60T 7/085; A61H 2003/046
USPC ....... 188/19, 20, 29, 4 R; 280/33.994, 250.1, 280/264
See application file for complete search history.

(56) References Cited

U.S. PATENT DOCUMENTS

| | | | | |
|---|---|---|---|---|
| 2,885,720 A | * | 5/1959 | Seeberger ............. | B60B 33/021 16/35 R |
| 4,018,440 A | * | 4/1977 | Deutsch .................... | A61H 3/04 482/68 |
| 4,384,713 A | * | 5/1983 | Deutsch .................... | B62B 5/04 482/68 |
| 5,112,044 A | * | 5/1992 | Dubats ..................... | A61H 3/04 188/29 |
| 5,603,517 A | * | 2/1997 | Lorman ................... | A61H 3/04 188/29 |
| 5,794,639 A | * | 8/1998 | Einbinder ................. | B62B 5/04 135/912 |

(Continued)

FOREIGN PATENT DOCUMENTS

| | | | | |
|---|---|---|---|---|
| KR | 101428420 B1 | * | 9/2014 | ............... A61H 3/04 |
| KR | 101702938 B1 | * | 2/2017 | ....... A61H 2003/046 |
| WO | WO-2015193834 A1 | * | 12/2015 | ............... B66B 1/32 |

*Primary Examiner* — Thomas J Williams
(74) *Attorney, Agent, or Firm* — Alan D. Kamrath; Karin L. Williams; Mayer & Williams PC

(57) ABSTRACT

A brake assembly has a wheel body, a first stopping device, and a second stopping device. The wheel body has a central axle and two engaging portions formed respectively on two ends of the central axle. The first stopping device is connected with the engaging portions of the wheel body and has a resilient member and a magnetic unit. The resilient member is C-shaped and has a lateral rod and an inclined rod connected integrally with an end of the lateral rod. The magnetic unit is mounted on the lateral rod of the resilient member and has a sleeve having a bottom opening and a magnetic element mounted in the sleeve and selectively abutting the wheel body. The second stopping device is connected securely with the lateral rod of the resilient member and is engaged selectively with the engaging portions of the wheel body.

7 Claims, 13 Drawing Sheets

(56) References Cited

U.S. PATENT DOCUMENTS

| | | | | |
|---|---|---|---|---|
| 5,984,334 | A | * | 11/1999 | Dugas .................. A61G 5/1054 |
| | | | | 280/42 |
| 6,378,663 | B1 | * | 4/2002 | Lee ....................... F16D 63/006 |
| | | | | 188/19 |
| 10,716,729 | B2 | * | 7/2020 | Hashimoto .......... A61H 3/0277 |
| 2002/0056595 | A1 | * | 5/2002 | Shaw ........................ B60T 1/04 |
| | | | | 188/29 |
| 2009/0120736 | A1 | * | 5/2009 | Masterson ................ B62B 5/04 |
| | | | | 188/19 |
| 2020/0101949 | A1 | * | 4/2020 | Tsai ........................ F16D 49/04 |

* cited by examiner

BRAKE DEVICE

BACKGROUND OF THE INVENTION

1. Field of the Invention

The present invention relates to a brake assembly, and more particularly to a brake assembly and a four-wheel vehicle having the same.

2. Description of Related Art

With reference to FIGS. 12 and 13, a conventional wheeled walker 80 comprises a body 81, two rear wheels 82, two front wheels 83, and two brake assemblies 84. The body 81 comprises two supporting units 811, a connection unit 812, and two handles 813. Each supporting unit 811 comprises an inverted T-shaped rod body. The connection unit 812 comprises an X-shaped element. Two sides of the connection unit 812 are connected respectively with inner surfaces of the supporting units 811. Each handle 813 is mounted on a top end of a corresponding one of the supporting units 811. Each supporting unit 811 comprises a rear bottom end and a front bottom end. Each rear wheel 82 is mounted on the rear bottom end of a corresponding one of the supporting units 811, and each front wheel 83 is mounted on the front bottom end of a corresponding one of the supporting units 811. The two brake assemblies 84 are mounted respectively on the handles 813 and are connected with the rear wheels 82 by cables, respectively.

However, when a user uses the conventional wheeled walker 80 to walk on a slope and has a weak grip strength, the weak grip strength of the user is insufficient to stop the wheeled walker 80, or the user may forget to brake the wheeled walker 80. The wheeled walker 80 will slide on the slope to cause the user to fall or to cause the wheeled walker to roll off from the slope. Therefore, the brake assemblies 84 of the conventional wheeled walker 80 have to be improved.

To overcome the shortcomings, the present invention tends to provide a brake assembly to mitigate or obviate the aforementioned problems.

SUMMARY OF THE INVENTION

To overcome the shortcomings of the conventional wheeled walker used on a slope, which easily rolls off from the slope to cause the user to fall because of insufficient braking effect, the main objective of the invention is to provide a brake assembly that is easily controlled and labor-saving in use to achieve an automatic braking effect.

The brake assembly has
a wheel body having a central axle and two engaging portions formed respectively on two ends of the central axle;
a first stopping device connected with the engaging portions of the wheel body and comprising
 a resilient member being C-shaped and having a lateral rod and an inclined rod connected integrally with an end of the lateral rod; and
 a magnetic unit mounted on the lateral rod of the resilient member and having
  a sleeve having a bottom opening; and
  a magnetic element mounted in the sleeve and selectively abutting the wheel body; and
a second stopping device connected securely with the lateral rod of the resilient member and engaged selectively with the engaging portions of the wheel body.

The brake assembly in accordance with the present invention has the following advantages.

1. On a plane surface, when two hands of a user hold the contact-sensing element on the handles, the magnetic element will be automatically moved upward relative to the sleeve and the toothed portions of the second stopping device are disengaged from the engaging portions of the wheel body. To brake the vehicle, the user only has to release the hands from the contact-sensing element on the handles. The wheel body will be moved to the un-rotating condition by the magnetic unit of the first stopping device and the toothed portions of the second stopping device. Consequently, the user can easily brake the four-wheel vehicle on a plane surface without gripping the brake. Therefore, the use of the brake in accordance with the present invention is convenient.

2. When the four-wheel vehicle is used on a slope, the magnetic element will slightly abut the outer surface of the wheel body to slow down the wheel body. At this time, the second stopping device is still moved downward, and the toothed portions of the second stopping device are disengaged from the engaging portions of the wheel body. Accordingly, the vehicle can be moved on the slope at a low speed to keep the four-wheel vehicle from pulling the user to move forward on the slope.

3. To sit on the four-wheel vehicle, the connection arms will drastically push the resilient member of the first stopping device downward, and the resilient member is drastically deformed. The angle between the lateral rod and the inclined rod will be further reduced. The bottom edge of the magnetic element will be embedded into the outer surface of the wheel body. The four-wheel vehicle can be kept at the braked condition firmly while the user sits on the vehicle, and the safety of using the four-wheel vehicle is improved.

4. With the first stopping device and the second stopping device in accordance with the present invention, two plastic components are formed during the manufacturing process. The assembling process for the brake assembly is easy. Compared with the conventional brake assembly assembled with two handles and having cables, the cost for the conventional brake assembly in relative high. The structures of the first stopping device and the second stooping device a simplified, and the cost for the brake assembly can be reduced. Without cables, the assembling cost can also be reduced.

DETAILED DESCRIPTION OF PREFERRED EMBODIMENT

Figure 1:
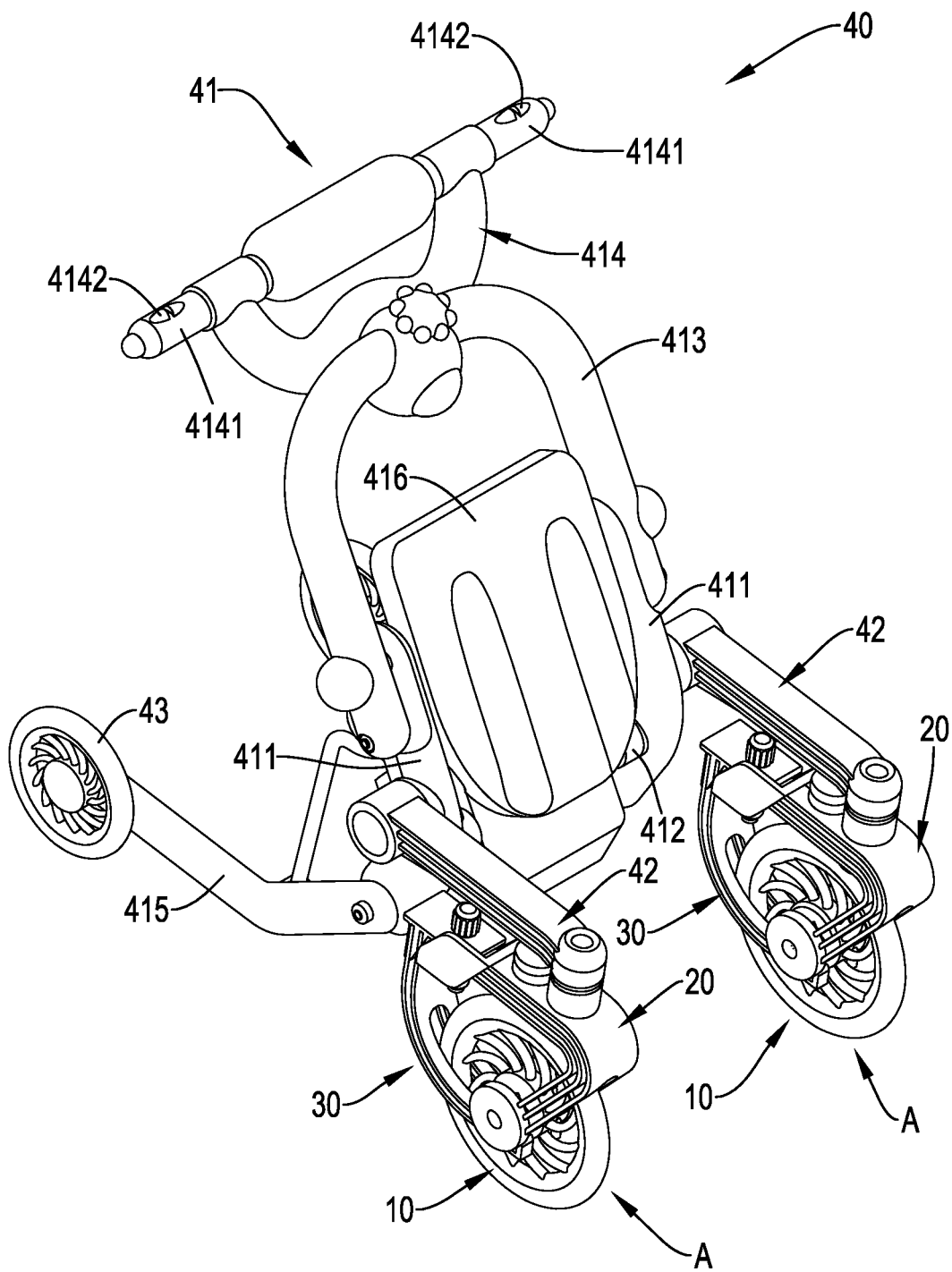
FIG. 1 is a perspective view of a brake assembly in accordance with the present invention mounted on a four-wheel vehicle.
Figure 2:
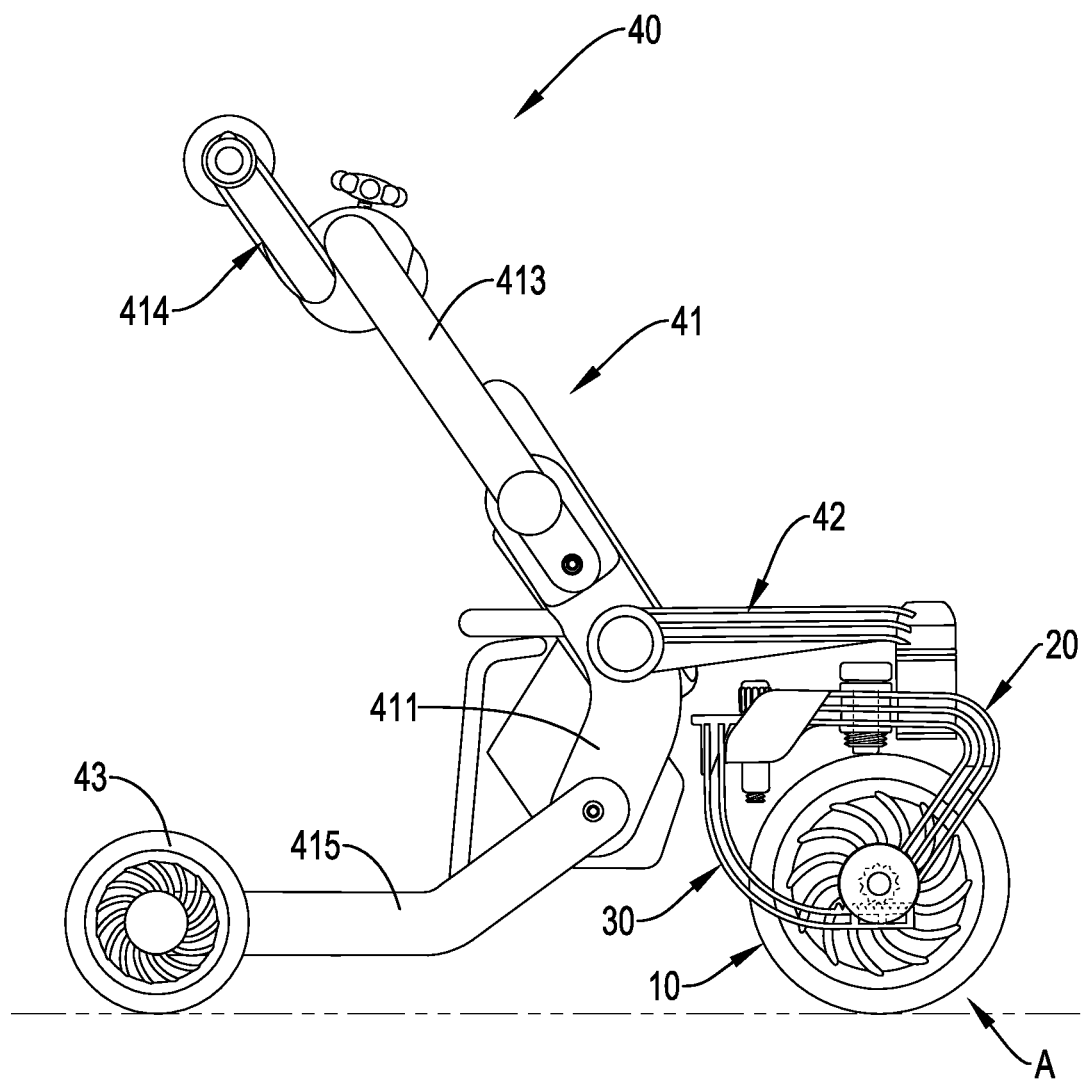
FIG. 2 is a side view of the brake assembly in accordance with the present invention mounted on the four-wheel vehicle.
Figure 3:
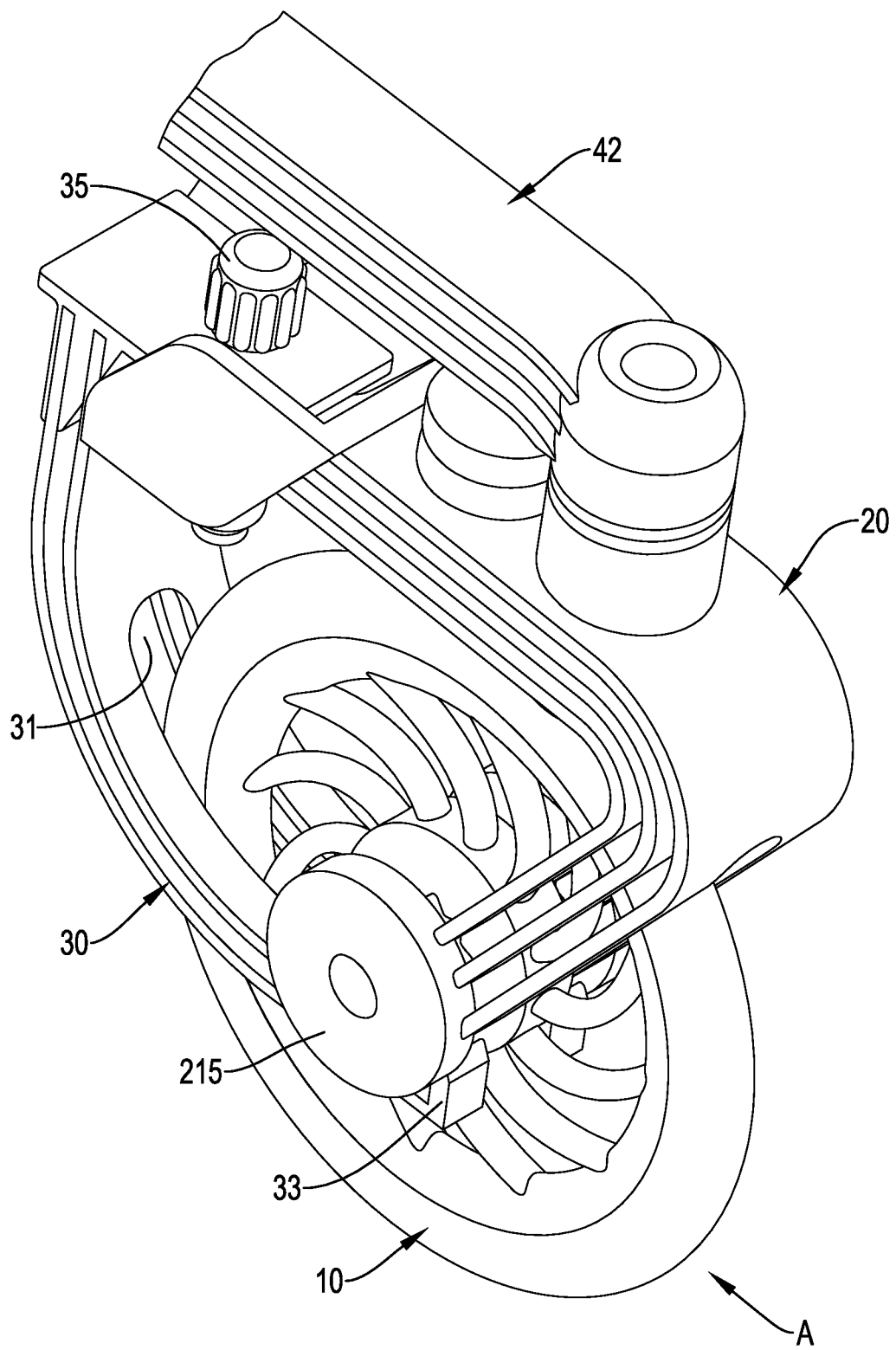
FIG. 3 is an enlarged perspective view of the brake assembly in accordance with the present invention.

Objects, advantages and novel features of the invention will become more apparent from the following detailed description when taken in conjunction with the accompanying drawings.

With reference to FIGS. 1 to 5, a brake assembly A in accordance with the present invention comprises a wheel body 10, a first stopping device 20, and a second stopping device 30.

The wheel body 10 comprises two engaging portions 11 formed respectively on two ends of a central axle, and each engaging portion 11 has a mounting hole 12 defined therein. Each engaging portion 11 of the wheel body 10 is a gear.

The first stopping device 20 is connected to the two engaging portions 11 of the wheel body 10. A mounting axle is mounted through the mounting holes 12 in the engaging portions 11 and the first stopping device 20 to allow the wheel body 10 to be rotatable relative to the first stopping device 20. The first stopping device 20 comprises a resilient member 21 and a magnetic unit 22. The resilient member 21 is C-shaped and comprises a lateral rod 211 and an inclined rod 212 connected integrally with an end of the lateral rod 211. The resilient member 21 may be plastic, such that the resilient member 21 is deformable when an external force is applied. The inclined rod 212 has a gap 213 into which the wheel body 10 partially extends. The resilient member 21 comprises a first open end 214 and two second open ends 215. The first open end 214 is located at an end of the lateral rod 211 opposite the inclined rod 212 and has an erect assembling stub 216. The assembling stub 216 is a hollow rod and has a thread formed on an inner surface thereof. The second open ends 215 are located at an end of the inclined rod 212 opposite the lateral rod 211 and each have a through hole 217. The central axle is mounted through the mounting holes 12 in the engaging portions 11 and the two through holes 217. The magnetic unit 22 is mounted on the lateral rod 22 of the resilient member 21 and comprises a sleeve 221 and a magnetic element 222. The sleeve 221 has a bottom opening. The magnetic element 22 is mounted in the sleeve 221 and selectively abuts the outer surface of the wheel body 10. Preferably, a wirelessly controlled electric coil is mounted in the sleeve 221 to allow the magnetic element 222 to extend out of or to retract into the sleeve 221.

The second stopping device 30 is mounted securely on the first open end 214 of the resilient member 21 and is selectively engaged with the engaging portions 11 of the wheel body 10. Preferably, the second stopping device 30 is arced in shape and has a slot 31 into which the wheel body 10 partially extends. The second stopping device 30 has a first free end 32 and two second free ends 33. The first free end 32 of the second stopping device 30 is connected securely with the first open end 24 of the resilient member 21. Each second free end 33 of the second stopping device 30 has a toothed portion 331, such that the engaging portions 11 of the wheel body 10 are selectively engaged with the toothed portions 331. Preferably, the first free end 32 of the second stopping device 30 has a holding hole 34 defined therein, and the holding hole 34 is a threaded hole. A bolt is mounted through the assembling stub 216 and the holding hole 34 to connect the second stopping device 30 securely with the first open end 214 of the resilient member 21. In addition, multiple rubber rings 36 are disposed between the first open end 214 of the resilient member 21 and the first free end 32 of the second stopping device 30 to provide a buffering and adjusting effect.

With reference to FIGS. 1 to 5, the brake assembly in accordance with the present invention is mounted on a four-wheel vehicle 40. The four-wheel vehicle 40 comprises a body 41, two connection arms 42, and two auxiliary wheels 43. The body 41 comprises two supporting rods 411, a connecting rod 412, a head 413, a handle unit 414, two curved rods 415, and a seat 416. The two supporting rods 411 are connected with each other by the connecting rod 412. The head 413 is connected securely with top ends of the supporting rods 411 and is an inverted U-shaped rod. The handle unit 414 is mounted securely on a top end of the head 413 and comprises two handles 4141. Each handle 4141 has a contact-sensing element 4142 electrically connected with and controlling the wirelessly controlled electric coil in the sleeve 221. The two curved rods 415 are connected securely with bottom ends of the supporting rods 411 respectively. The seat 416 is pivotally disposed between the supporting rods 411. The two connection arms 42 are connected securely with the supporting rods 411 of the body 41 respectively. Each connection arm 42 is connected securely with the first stopping device 20 of a brake assembly A. The two auxiliary wheels 43 are disposed respectively on bottom ends of the curved rods 415 respectively.

Figure 4:
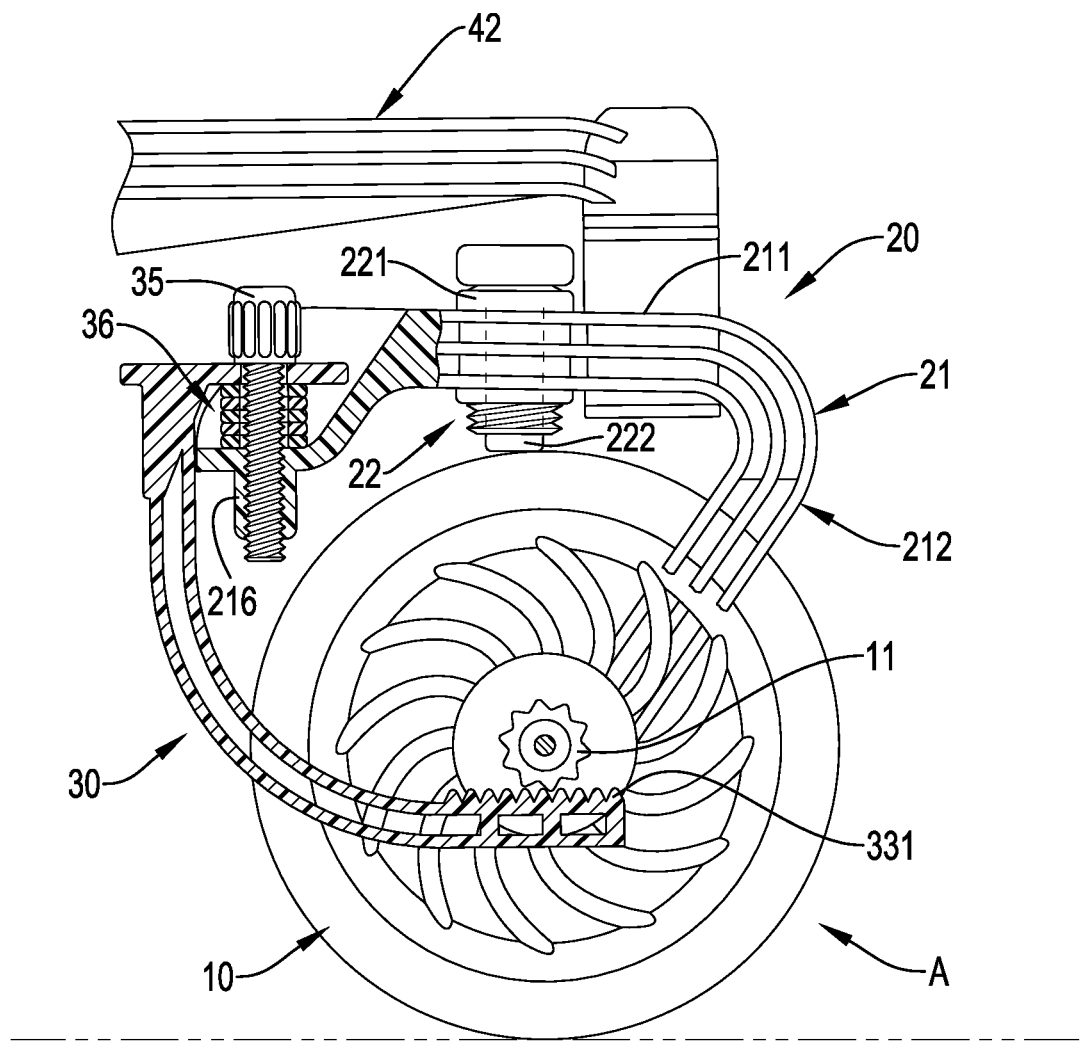
FIG. 4 is a side view in partial section of the brake assembly in accordance with the present invention.
Figure 5:
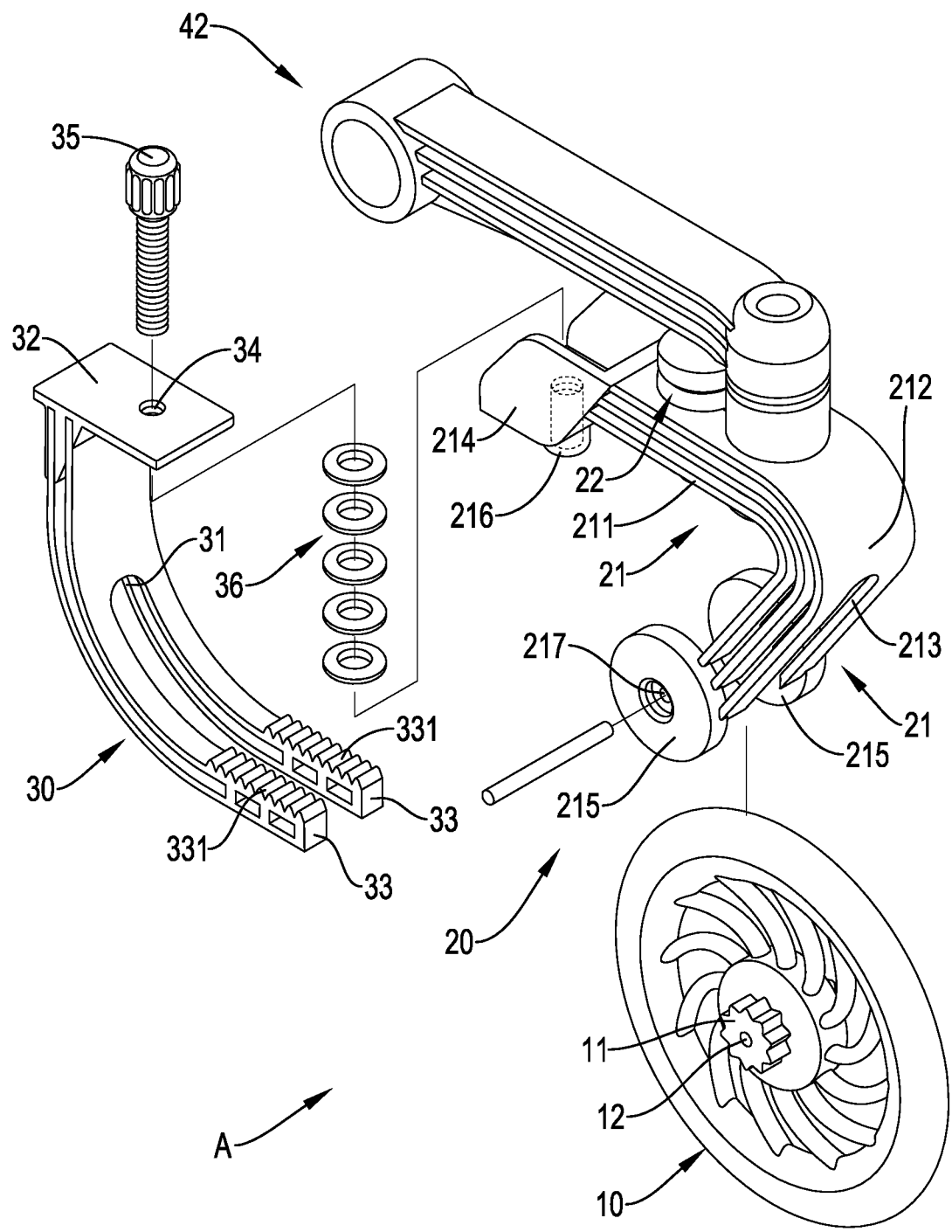
FIG. 5 is an exploded perspective view of the brake assembly in accordance with the present invention.

With reference to FIGS. 1 and 4, when the four-wheel vehicle 40 is not in use, the magnetic element 222 extends out of the sleeve 221 and the bottom end of the magnetic element 222 abuts the outer surface of the wheel body 10. The toothed portions of the second stopping device 30 are engaged with the engaging portions 11 of the wheel body 10. With the magnetic unit 22 of the first stopping device 20 and the toothed portions 331 of the second stopping device 30, the wheel body 10 is kept from rotating.

Figure 6:
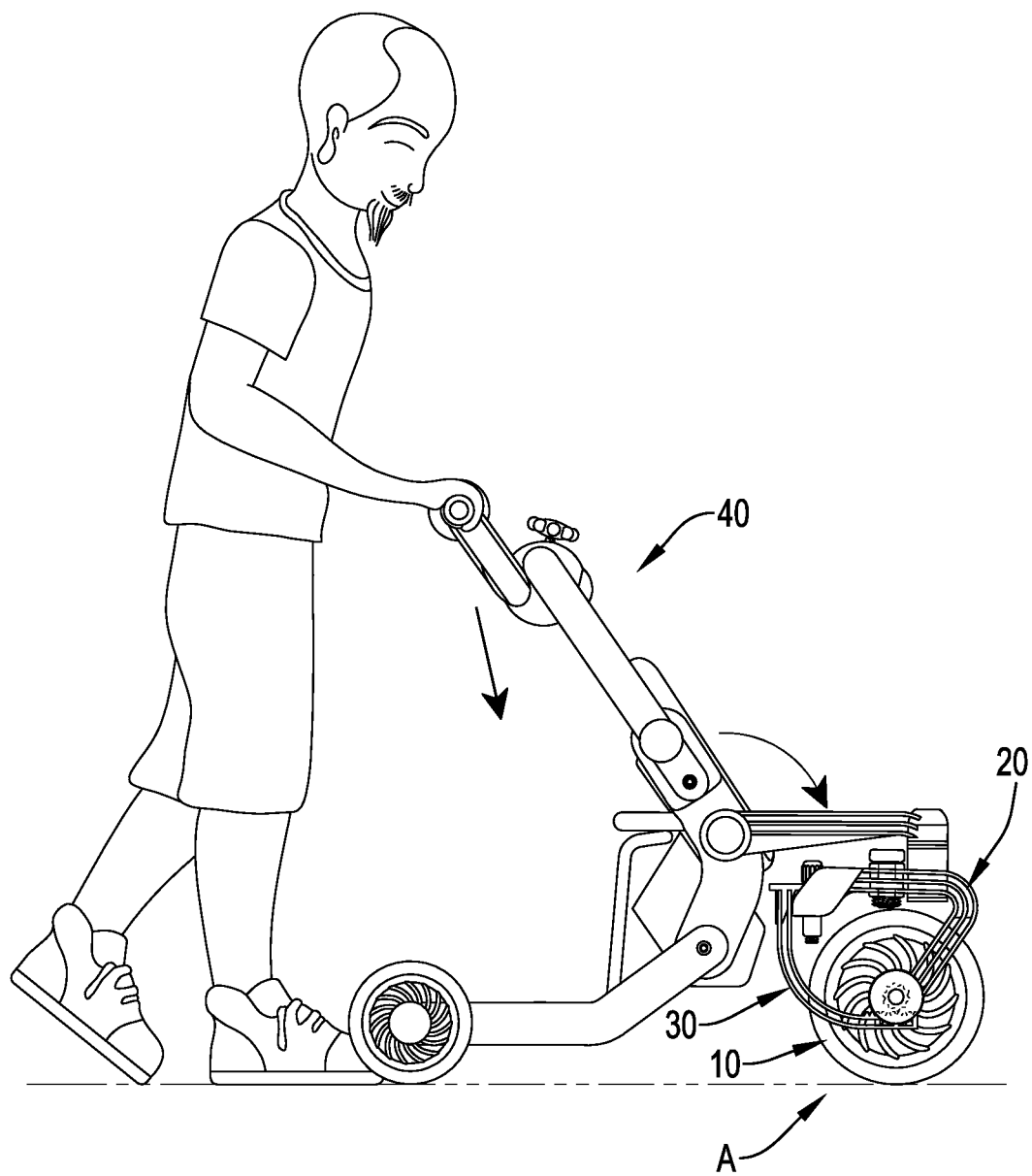
FIG. 6 is an operational side view of the brake assembly in accordance with the present invention mounted on the four-wheel vehicle.
Figure 7:
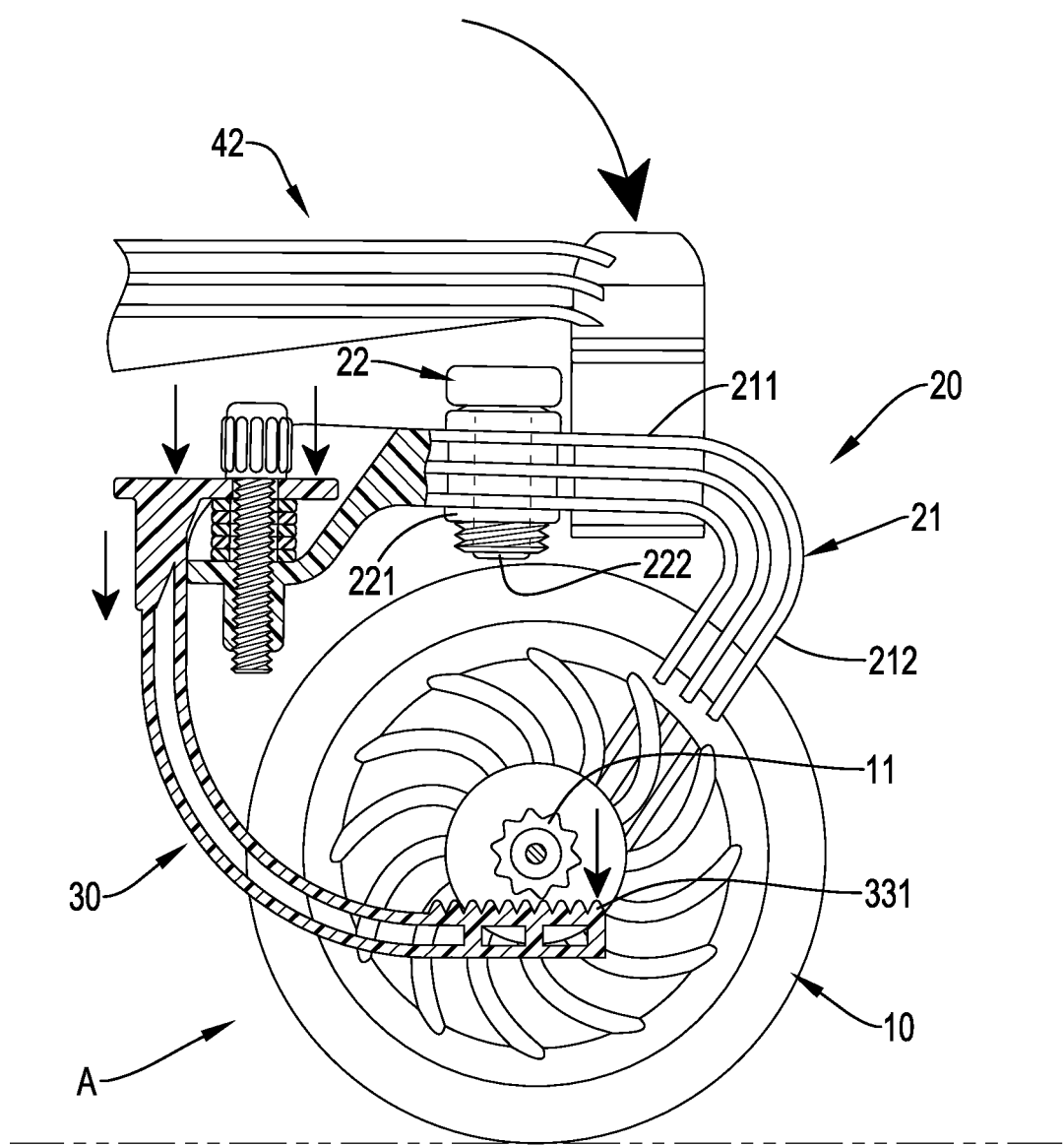
FIG. 7 is an enlarged operational side view in partial section of the brake assembly in accordance with the present invention.

With reference to FIGS. 1, 6, and 7, when the four-wheel vehicle 40 is used on a plane surface, two hands of a user hold the contact-sensing element 4142 on two handles 4141 to push the four-wheel vehicle 40 to move forward. The two contact-sensing elements 4142 will send signals to the two magnetic units 22 to move the magnetic element 222 to move upward relative to the sleeve 221. At this time, the bottom edge of the magnetic element 222 still extends out of the sleeve 221 but is kept from abutting the wheel body 10. The two connection arms 42 will push the resilient member 21 of the first stopping device 20 downward due to a part of the weight of the user, and the resilient member 21 is deformed. An angle between the lateral rod 211 and the inclined rod 212 will be reduced. Because the second stopping device 30 is connected securely with the first open end 214 of the resilient member 21, the toothed portions 331 are disengaged from the engaging portions 11 of the wheel body 10 when the second stopping device 30 is moved downward. Consequently, the wheel body 10 is rotatable. In other words, to brake the vehicle, the user only has to release the hands from the contact-sensing elements 4142 on the handles 414. With the magnetic units 22 of the first stopping device 20 and the toothed portions 331 of the second stopping device 30, the wheel body 10 can be automatically moved to an un-rotating condition and be braked.

Figure 8:
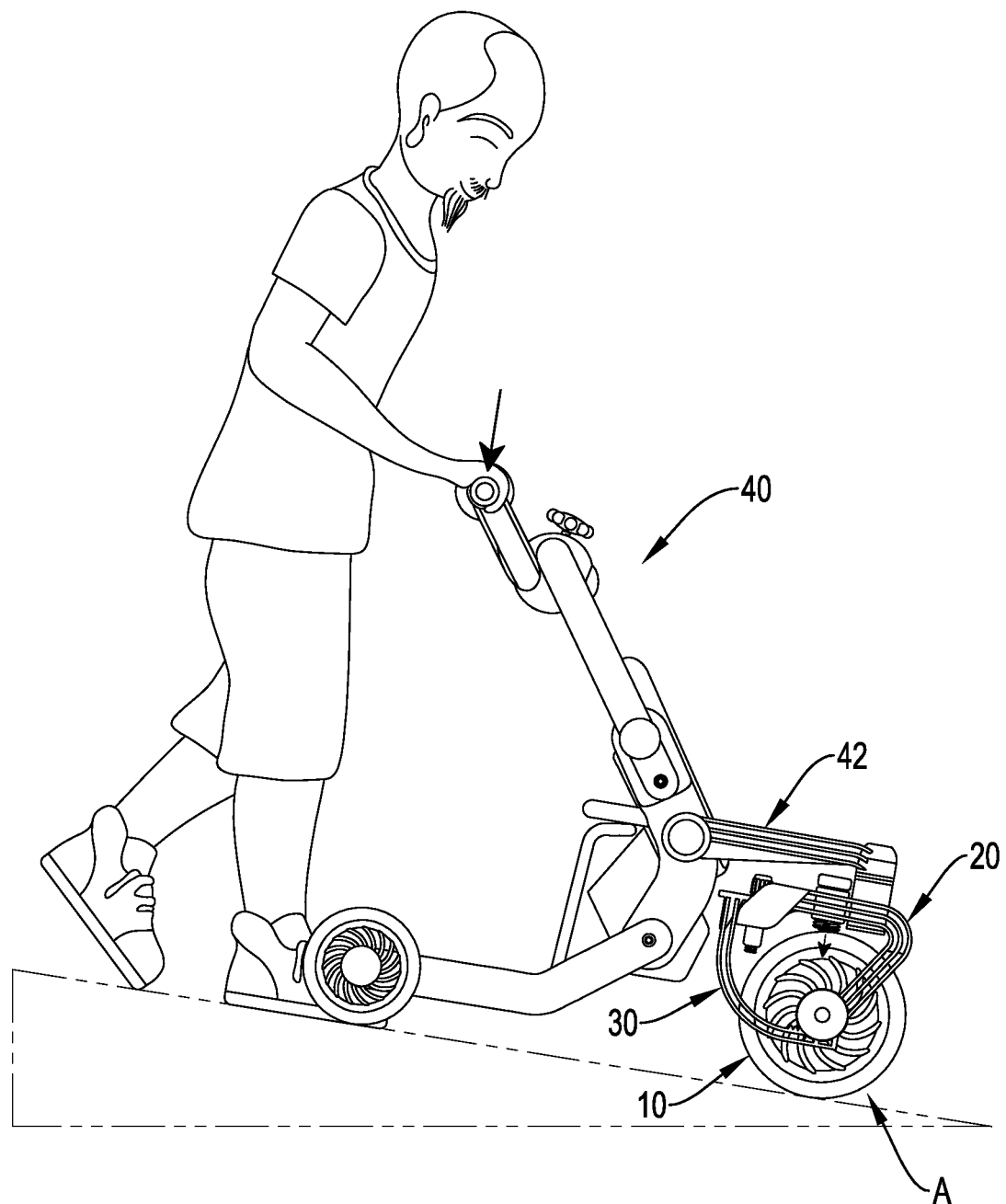
FIG. 8 is an operational side view of a four-wheel vehicle with the brake assembly in accordance with the present invention on a slope.
Figure 9:
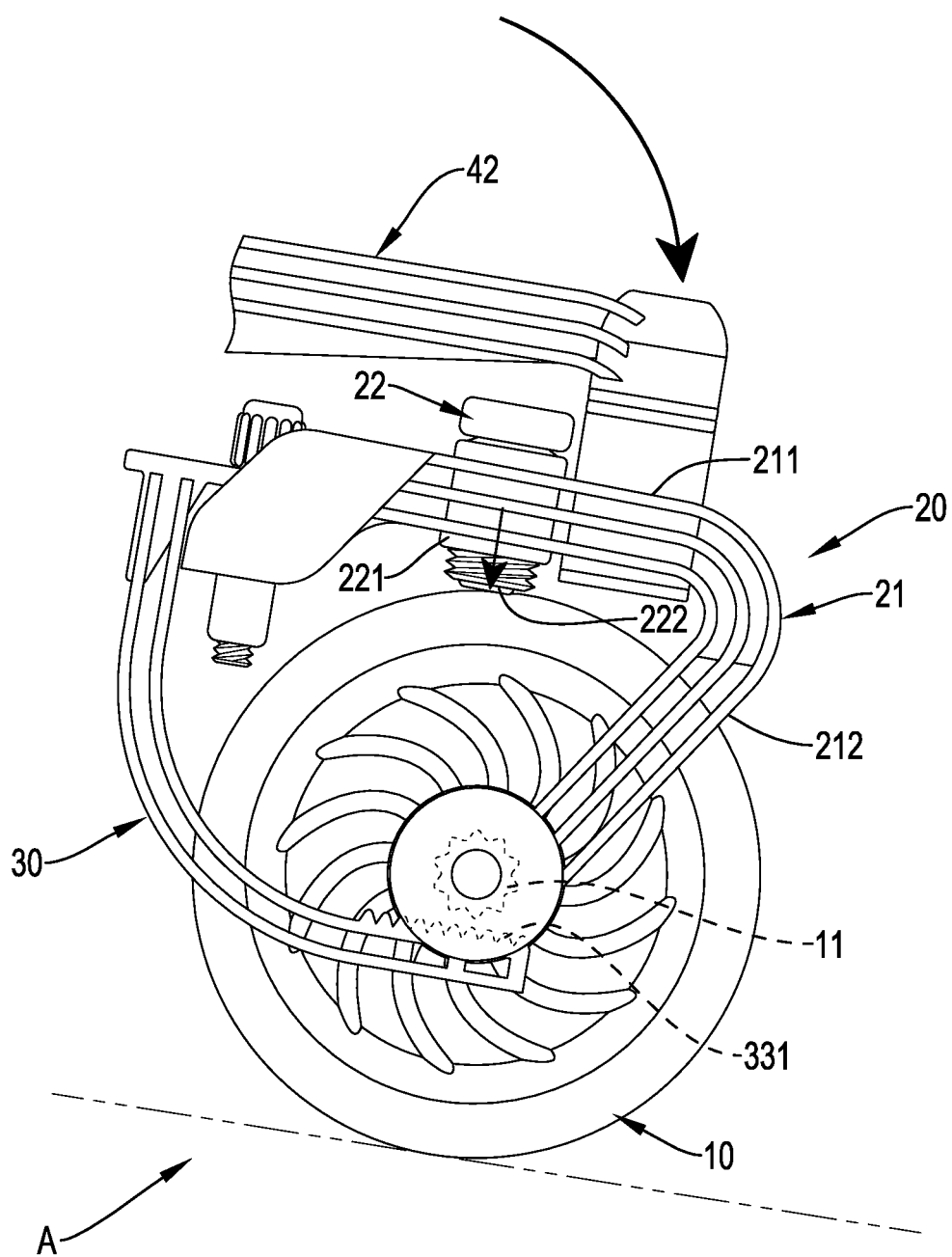
FIG. 9 is an enlarged operational side view of the brake assembly in accordance with the present invention on the slope.

With reference to FIGS. 1, 8, and 9, when the four-wheel vehicle 40 is used on a slope, two hands of a user hold the contact-sensing element 4142 on two handles 4141 to push the four-wheel vehicle 40 to move forward. The two contact-sensing elements 4142 will send signals to the two magnetic units 22 to move the magnetic element 222 to move upward relative to the sleeve 221. On the slope, most of the weight of the user will make two connection arms 42 push the resilient member 21 of the first stopping device 20 downward, and the resilient member 21 is deformed. The angle between the lateral rod 211 and the inclined rod 212 will be further reduced, such that the bottom edge of the magnetic element 222 will slightly abut the wheel body 10 due to the downward force provided by the user. Consequently, the vehicle will be slowed down and the wheel body 10 is still rotatable. At this time, the second stopping device 30 is also moved downward, and the toothed portions 331 of the second stopping device 30 are kept from engaging with the engaging portions of the wheel body 10.

Figure 10:
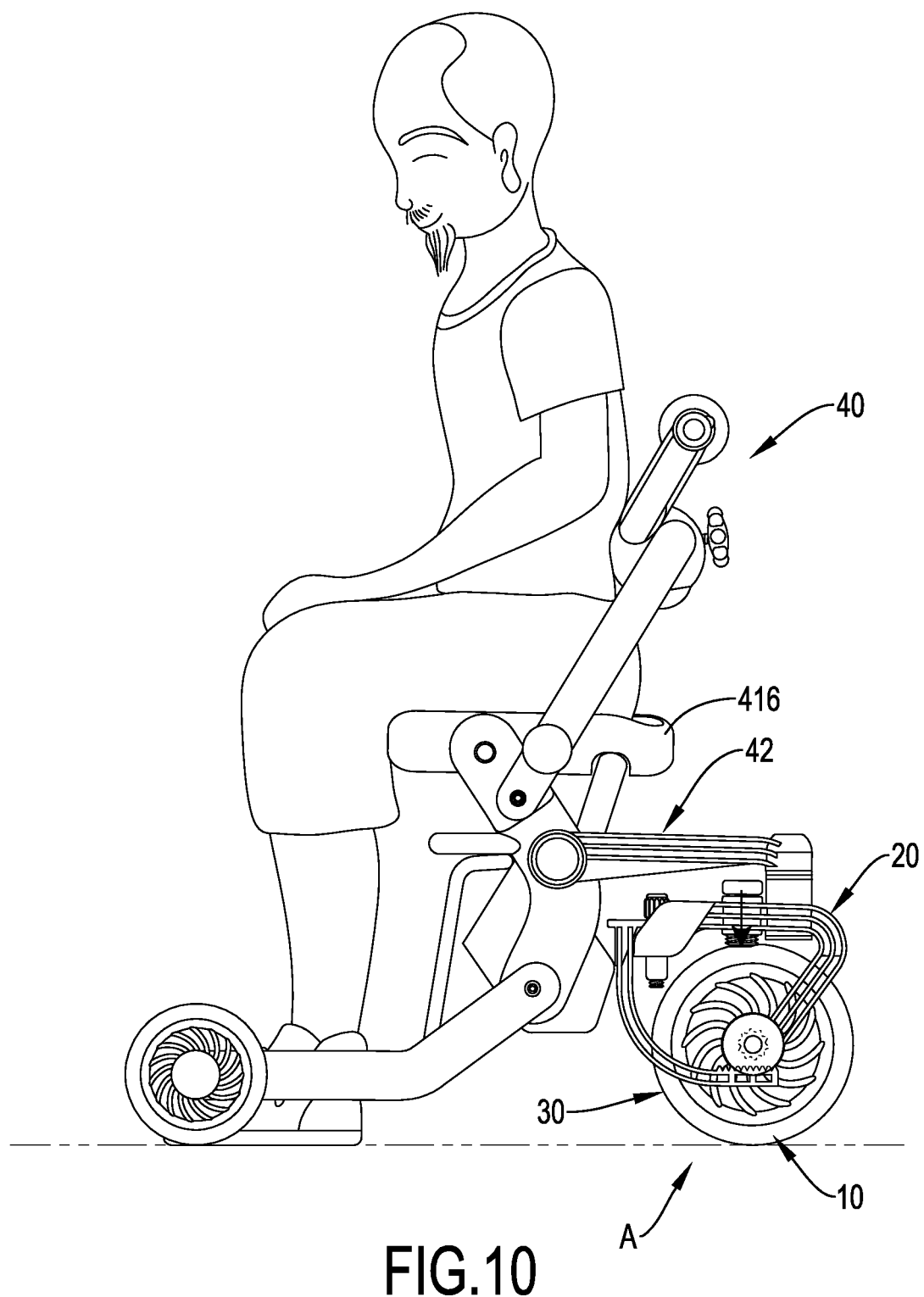
FIG. 10 is an operational side view of the four-wheel vehicle in accordance with the present invention with a user sitting thereon.
Figure 11:
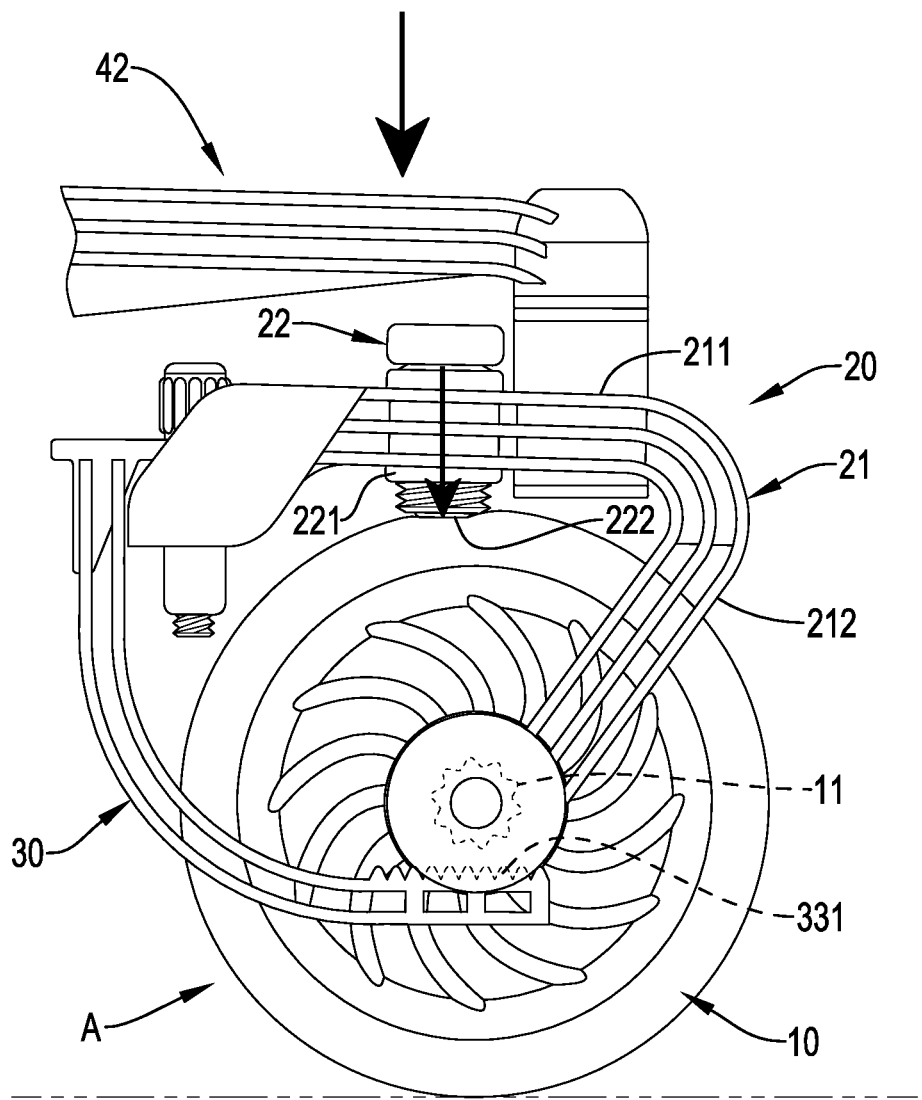
FIG. 11 is an enlarged operational side view of the brake assembly in accordance with the present invention.
Figure 12:
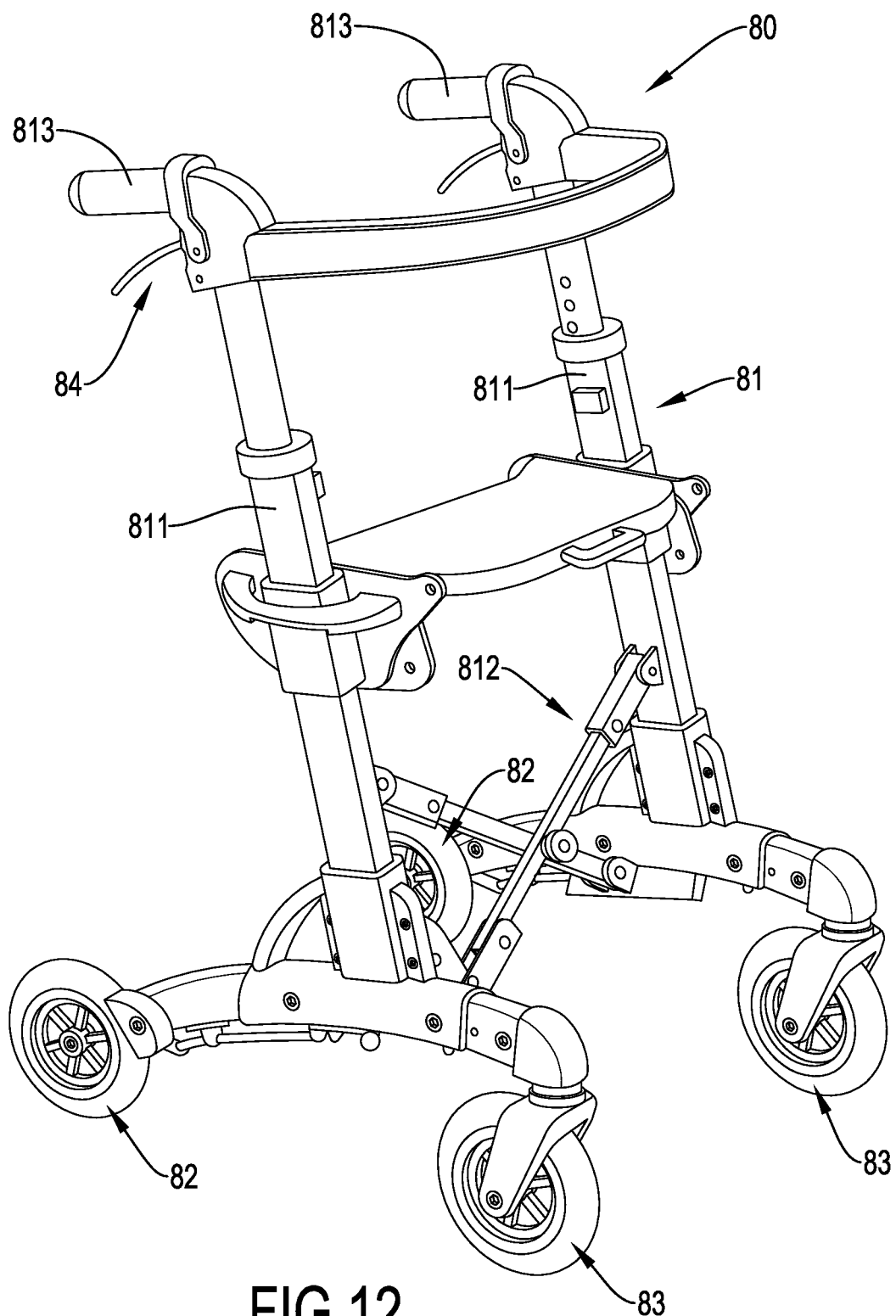
FIG. 12 is a perspective view of a conventional wheeled walker.
Figure 13:
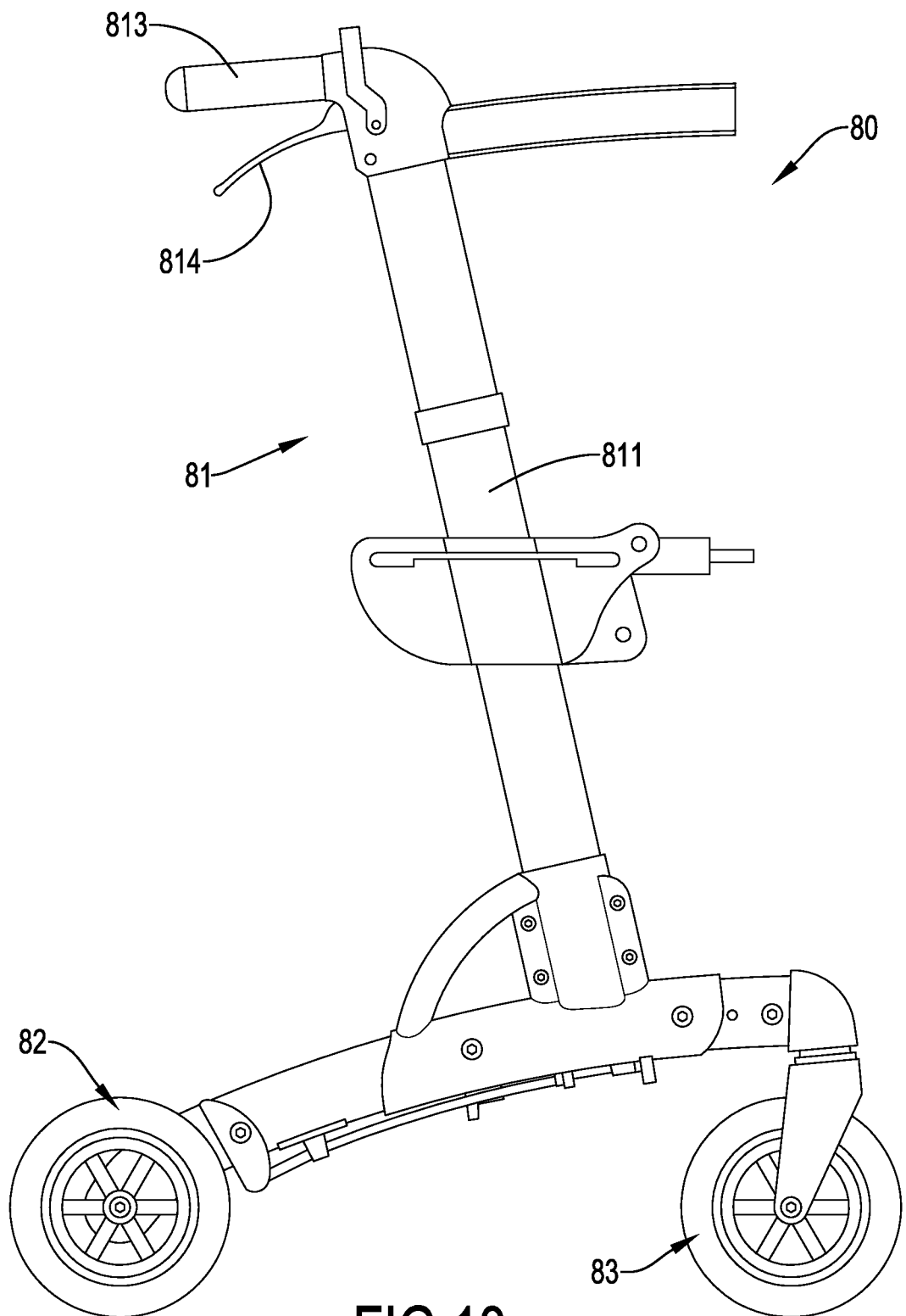
FIG. 13 is a side view of the conventional wheeled walker.

With reference to FIGS. 1, 10, and 11, when the user wants to sit on the four-wheel vehicle 40, the seat 416 of the body 41 is turned to a horizontal position. While the user sits on the vehicle 40, two hands of the user are released from the contact-sensing elements 4142 on the handles 4141. The magnetic element 22 of the first stopping device 20 extends out of the sleeve 221 and abuts the outer surface of the wheel body 10. The connection arms will drastically push the resilient member 21 of the first stopping device 20 downward, and the resilient member 21 is drastically deformed. The angle between the lateral rod 211 and the inclined rod 212 will be further reduced. The bottom edge of the magnetic element 22 will be embedded into the outer surface of the wheel body 10. Because the second stopping device 30 is connected securely with the first open end 214 of the resilient member 21, the second stopping device 20 is moved downward and the toothed portions 331 of the second stopping device 30 are disengaged from the engaging portions 11 of the wheel body 10. Accordingly, the wheel body 10 is kept at an un-rotating position firmly to improve the safety of the user sitting on the vehicle.

The brake assembly in accordance with the present invention has the following advantages.

1. On a plane surface, when two hands of a user hold the contact-sensing element 4142 on the handles 4141, the magnetic element 222 will be automatically moved upward relative to the sleeve 221 and the toothed portions 331 of the second stopping device 30 are disengaged from the engaging portions 11 of the wheel body 10. To brake the vehicle, the user only has to release the hands from the contact-sensing element 4142 on the handles 4141. The wheel body 10 will be moved to the un-rotating condition by the magnetic unit 22 of the first stopping device and the toothed portions 331 of the second stopping device 30. Consequently, the user can easily brake the four-wheel vehicle 40 on a plane surface without gripping the brake. Therefore, the use of the brake in accordance with the present invention is convenient.

2. When the four-wheel vehicle 40 is used on a slope, the magnetic element 22 will slightly abut the outer surface of the wheel body 10 to slow down the wheel body 10. At this time, the second stopping device 30 is still moved downward, and the toothed portions 331 of the second stopping device 30 are disengaged from the engaging portions of the wheel body 10. Accordingly, the vehicle can be moved on the slope at a low speed to keep the four-wheel vehicle from pulling the user to move forward on the slope.

3. For the user to sit on the four-wheel vehicle 40, the connection arms 42 will drastically push the resilient member 21 of the first stopping device 20 downward, and the resilient member 21 is drastically deformed. The angle between the lateral rod 211 and the inclined rod 212 will be further reduced. The bottom edge of the magnetic element 22 will be embedded into the outer surface of the wheel body 10. The four-wheel vehicle 40 can be kept at the braked condition firmly while the user is sitting on the vehicle, and the safety of using the four-wheel vehicle is improved.

4. With the first stopping device 20 and the second stopping device 30 in accordance with the present invention, two plastic components are formed during the manufacturing process. The assembling process for the brake assembly is easy. As for the conventional brake assembly 84 assembled with two handles 413 and having cables, the cost for the conventional brake assembly in relative high. The structures of the first stopping device 20 and the second stooping device 30 are simplified, and the cost for the brake assembly can be reduced. Without cables, the assembling cost can also be reduced.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A brake assembly comprising:
   a wheel body having a central axle and two engaging portions formed respectively on two ends of the central axle;
   a first stopping device connected with the engaging portions of the wheel body and comprising
      a resilient member being C-shaped and having a lateral rod and an inclined rod connected integrally with an end of the lateral rod; and
      a magnetic unit mounted on the lateral rod of the resilient member and having
         a sleeve having a bottom opening; and
         a magnetic element mounted in the sleeve and selectively abutting the wheel body; and
   a second stopping device connected securely with the lateral rod of the resilient member and engaged selectively with the engaging portions of the wheel body.

2. The brake assembly as claimed in claim 1, wherein each engaging portion is a gear.

3. The brake assembly as claimed in claim 1, wherein the resilient member is plastic.

4. The brake assembly as claimed in claim 1, wherein the inclined rod has a gap into which the wheel body partially extends.

5. The brake assembly as claimed in claim 1, wherein the second stopping device is arced in shape.

6. The brake assembly as claimed in claim 1, wherein the second stopping device has a slot in which the wheel body partially extends.

7. The brake assembly as claimed in claim 1, wherein the resilient member has
   a first open end located at an end of the lateral rod opposite the inclined rod and having an erect assembling stub being hollow and provided with a thread on an inner surface of the assembling stub; and two second open ends;

the second stopping device has a first free end having a threaded holding hole defined in the first free end; and two second free ends; and a bolt is mounted through the assembling stub and the holding hole.

* * * * *